United States Patent Office 3,728,285
Patented Apr. 17, 1973

3,728,285
CATALYST AND USE THEREOF FOR THE POLYMERIZATION OF EPOXIDES
Junji Furukawa, Koto, Nariyoshi Kawabata, Osaka, and Mikio Nakaniwa and Saburo Kanbara, Kyoto, Japan, assignors to Maruzen Petrochemical Company Limited, Tokyo, and The Toyo Rubber Industry Co., Osaka, Japan
No Drawing. Filed Feb. 8, 1967, Ser. No. 614,550
Claims priority, application Japan, Feb. 10, 1966, 41/7,386; Jan. 27, 1967, 42/5,000
Int. Cl. C08g 23/14
U.S. Cl. 260—2 A                    10 Claims

ABSTRACT OF THE DISCLOSURE

Polymerization of epoxides by the use of a catalyst is shown. The catalyst comprises a reaction product of a dialkylzinc such as diethylzinc with a nitro compound selected from the group consisting of mono- and di-nitroparaffins, mono- and di-nitroolefins, halogene-substituted nitroparaffins, alkyl-nitroalkyl ethers, mono- and di-nitrocycloalkanes and phenylnitromethane. The catalyst may also be used advantageously for the homo- or co-polymerization of epoxides to prepare high molecular weight polyepoxides.

---

The present invention relates to a catalyst, as a new composition of matter, suitable for use in the polymerization of epoxides and the preparation thereof and to a new and improved process of polymerizing epoxides using the said catalyst for preparing high molecular weight polyepoxides.

It has already been proposed that various catalyst systems comprising organozinc compounds in combination with a compound having active hydrogen may be used for the preparation of high molecular weight polyalkylene oxides. Among these catalysts, for instance, there may be exemplified a reaction product of a dialkylzinc with water, a reaction product of a dialkylzinc with a polyol, a chelated organoaluminum compound and a reaction product thereof with water and a reaction product of a dialkylzinc with methyl vinyl ketone or acetone. The active species of these catalysts may be considered to be a reaction product of a dialkylzinc with an electron donor containing active hydrogen. However, these catalyst systems tend to become heterogenous and to lower or lose their catalytic activities during the polymerization in which they are used. Further, they only give relatively low molecular weight polymers of alkylene oxides. For example, in the polymerization of propylene oxide, most of these catalysts result in polypropylene oxides having intrinsic viscosities of less than 10 except the case where a dialkylzinc-methyl vinyl ketone system is used as catalyst.

It is an object of the present invention to provide a new catalyst suitable for use in the polymerization of epoxides. Another object of the present invention is to provide a process for the preparation of the said catalyst. A further and an important object of the present invention is to provide a process for the polymerization of epoxides, which is particularly useful for the production of high molecular weight polyepoxides. Other objects will be apparent to those skilled-in-the-art on inspection of the following description.

According to the present invention, therefore, we provide a catalyst, as a new composition of matter, suitable for use in the polymerization of epoxides comprising a reaction product of a dialkylzinc with a nitro compound containing at least one nitro group adjacent to a carbon atom to which at least one active hydrogen atom is attached.

The new catalyst according to the present invention is present in a stable and a substantially homogeneous state and has further advantages that the catalytic activity thereof is rather high at elevated temperatures and does not lower even after subjecting said catalyst to a high temperature treatment for a long period.

Further, according to the present invention, we provide a process for the polymerization of epoxides which comprises polymerizing at least one epoxide in the presence of a catalyst comprising a reaction product of an organometallic compound selected from the group consisting of dialkylzinc compounds with a nitro compound containing at least one nitro group adjacent to a carbon atom to which at least one active hydrogen atom is attached.

According to the present invention, by the use of the new catalyst the polymerization reaction may be conducted very smoothly and polyepoxides having much higher molecular weights than those obtained by known processes may be obtained.

By the term "polymerization" is meant homopolymerization and copolymerization throughout the specification and claims. Further, the term "nitro compound" used hereinafter means a nitro compound containing at least one nitro group adjacent to a carbon atom to which at least one active hydrogen atom is attached, which is to be used in the present invention.

Nitro compounds to be used for preparing the catalyst of the present invention may be any of those containing at least one nitro group adjacent to a carbon atom to which at least one active hydrogen atom is attached. Nitro compounds containing at least one nitro group adjacent to a carbon atom to which two or three active hydrogen atoms are attached are particularly preferred.

Typical examples of usable nitro compounds include nitroparaffins including mono- and di-nitroparaffins, such as nitromethane, nitroethane, 1-nitropropane, 2-nitropropane, 1-nitro-n-butane, 2-nitro-n-butane, 1,2-dinitroethane, 1,1-dinitropropane, 2,2-dinitropropane etc.; nitroolefins including mono- and di-nitroolefins such as nitroethylene, 2-nitro-1-propene, 1-nitro-1-propene, 2,3-dinitro-2-butene, 3,4-dinitro-3-hexene etc.; halogen-substituted nitroparaffins such as chloronitromethane, 1-chloro-1-nitroethane, 2-chloro-1-nitroethane etc.; nitroethers such as methyl-2-nitroethylether, ethyl-2-nitroethylether etc.; nitroaldehydes such as nitroacetaldehyde etc.; nitroketones such as nitroacetone etc.; nitroamines such as methylnitramine etc.; cycloaliphatic nitro compounds such as nitrocyclohexane, 1-methyl-1-nitrocyclohexane, 1,2-dinitrocyclohexane etc.; and phenylnitromethane. Particularly preferred nitro compounds are nitromethane, nitroethane and phenylnitromethane.

Organometallic compounds to be used for preparing the catalyst of the present invention may be any of dialkylzinc compounds which can be reacted with the nitro compounds used. Typical dialkylzincs include dimethylzinc, diethylzinc, di-n-propylzinc, diisopropylzinc and dibutylzinc.

According to the present invention, the catalyst is prepared by bringing together a dialkylzinc and a nitro compound.

The activity of the catalyst of the present invention prepared by the reaction of a dialkylzinc compound with a nitro compound may vary with the changes of kinds and proportions of the catalyst components and with the reaction temperatures used. It is preferred, in general, for the preparation of catalyst to use the nitro compound in an amount of less than 4.0 moles, preferably of about 0.05–1.0 mole per mole of the organometallic compound.

The preparation of the catalyst, that is, the reaction of dialkylzinc compounds with nitro compounds, may be carried out in the absence of a diluent, but the presence of a diluent for the nitro compounds is preferred to conduct the reaction smoothly and to obtain a homogeneous catalyst system. Any diluent which is inert under the reaction conditions may be used. The use as inert diluent of aliphatic hydrocarbons such as butane, pentane, hexane, heptane, octane etc., aromatic hydrocarbons such as benzene, toluene, xylene, Tetralin etc., cycloaliphatic hydrocarbons such as cyclohexane, Decalin etc., aliphatic or cycloaliphatic ethers such as ethylether, butylether, dioxane, tetrahydrofuran, 1,2-dimethoxyethane etc. may be preferred. The preparation of the catalyst may be carried out in the presence of epoxy compound to be polymerized. The temperature for the preparation of catalyst may vary within a wide range. Since, however, the reaction between the dialkylzinc and nitro compounds is relatively violet and exothermic with the generation of gases, it is desirable to add a diluted solution of organometallic compound in an appropriate solvent to a diluted solution of nitro compound in the same solvent at a temperature of from —78° C. to room temperature. In particular, the addition of a solution of dialkylzinc compound to a solution of nitro compound cooled to —78° C. is most suitable to obtain a completely or substantially completely homogeneous catalyst system. The catalyst in solution thus obtained may be used as it is in the polymerization of epoxides. If, however, such a freshly prepared catalyst is insufficient in its activity, it is particularly preferred to subject the catalyst to aging treatment to enhance the activity thereof to the maximum. The temperature and time for said aging treatment may vary within a wide range with varying the proportions of organometallic compound to nitro compound. When the aging treatment is carried out in an open system under a nitrogen atmosphere where gases generated from the catalyst system during the aging are discharged out of the system, it is preferable to carry out the aging treatment at a temperature from room temperatures to 250° C. for 10 minutes to 2 days, for example at 100° C. for 10 minutes to 3 hours or at 50° C. for 6 to 48 hours. On the other hand, when the aging treatment is carried out in a closed system, it is preferable to carry out the aging treatment at a temperature from room temperatures to 250° C. for 10 minutes to 7 days, preferably at 100° C. for 24 to 50 hours.

It is a surprising fact that the catalyst according to the present invention is in the form of a substantially homogeneous solution, and, nevertheless, has a significantly high activity in the polymerization of epoxides over a long period, in view of the prior known catalysts, particularly those comprising a reaction product of dialkylzinc with a compound containing a functional group such as OH, SH or NH$_2$ group, which tend to become heterogenous and which tend to lower or lose their activities relatively rapidly.

The catalyst-forming reaction which involves a violent reaction with the generation of gases is believed to be a chemical reaction by which a chemical bond is formed between the organometallic compound and nitro group, not but a mere coordination therebetween. The reaction involved may be considered as addition reaction, complex-forming reaction and subsequent substitution reaction, the degree of respective reaction varying with the reaction conditions.

Any epoxide may be homopolymerized or copolymerized with a second epoxy compound by the process of the present invention with improved results. Typical examples of epoxides which may be homopolymerized or copolymerized are ethylene oxide; mono- and di-substituted ethylene oxides

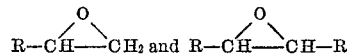

where R stands for a hydrocarbon radical such as alkyl, aryl, cycloalkyl, etc.—for instance alkylene oxides such as propylene oxide, 1-butene oxide, isobutylene oxide etc. and substituted alkylene oxides such as cyclohexene oxide, styrene oxide, phenyl glycidyl ether, bisphenol glycidyl ether etc.; halogen-containing epoxides, for instance epichlorohydrin, epibromohydrin, epifluorohydrin, trifluoroethylene oxide, perfluoropropylene oxide, perfluoroethylene oxide etc.; unsaturated epoxides, for instance allyl glycidyl ether, vinyl glycidyl ether, vinylcyclohexene mono- or di-oxide, butadiene monoxide, etc.

The polymerization reaction may be carried out by any desired manner, either as a batch or a continuous process. The amount of catalyst to be used is not limitative and may vary within a wide range, but is usually within the range of 0.05 to 10% by mole, preferably 0.1 to 1% by mole based on the epoxide to be polymerized. The catalyst may be added to the polymerization reaction system at a time or intermittently during the polymerization or continuously throughout the polymerization. If necessary the monomer or monomers to be polymerized may be added gradually to the polymerization system. The polymerization may be carried out without diluent, but it is usually preferable to use an inert diluent which is conveniently the same one as used in the preparation of the catalyst. The temperature and pressure conditions for the polymerization according to the present invention may vary within wide ranges. Usually, the polymerization may be carried out at a temperature from —70° C. to 200° C. preferably from 0° C. to 100° C. and under autogenous pressure. If desired, a subatmospheric or a superatmospheric pressure may also be used.

The following examples will further illustrate the preparation of the catalyst and the process of polymerizing various epoxides in accordance with the present invention in which all parts and percentages are by weight.

EXAMPLE 1

Into a 40 cc. glass polymerization tube filled with nitrogen was charged 0.25 cc. of a nitromethane solution which was previously prepared under nitrogen atmosphere by dissolving 3.051 g. (0.05 mole) of nitromethane into toluene to obtain the total volume of 50 cc. The solution was cooled to —78° C. in a methanol-Dry Ice bath and 1.0 cc. of a diethylzinc solution which was previously prepared by dissolving 5.1 cc. (0.05 mole) of diethylzinc into toluene to obtain the total volume of 50 cc. was added thereto. On the addition of diethylzinc solution, the nitromethane solution was slightly coloured with yellow. The polymerization tube was then taken out from the cooling bath, heated in an oil bath at 100° C. for 30 minutes (an open system) and thereafter allowed to stand until it was cooled to room temperature, where the reaction mixture, catalyst solution, was quite homogenous and had a slightly yellow colour.

The catalyst solution thus obtained had the molar ratio of nitromethane to diethylzinc of 0.25:1. To this catalyst solution was added, under nitrogen atmosphere, 18.8 cc. of toluene and the mixture was cooled to —78° C. Then, 6.8 cc. (0° C.) of propylene oxide was added to the catalyst system thus obtained and the tube was sealed and maintained at 73° C. in a polymerization bath for 24.5 hours. At the end of this period, the tube was opened and a sufficient amount of benzene was added to the polymer thus formed to give a low viscosity solution of the polymer easy to handle and a small amount of methanol was then added thereto to destroy the catalyst. The mixing was centrifuged to remove solid matters therefrom and the liquid portion was freeze-dried. The polymer thus obtained was a slightly yellow or nearly white rubbery elastomer. The yield and conversion of polymer were 3.24 g. and 58.3%, respectively. The polymer had the intrinsic viscosity of 28.5 measured at 25° C. with respect to the benzene solution and the acetone-insoluble matter of 18.0%.

EXAMPLE 2

In this example, five runs were carried out using the same procedure as described in Example 1 except that 2-nitropropane in various amounts was used in place of nitromethane and that the polymerization time was 107 hours. The 2-nitropropane was used as a toluene solution which was prepared by dissolving 4.4505 g. (0.05 mole) of 2-nitropropane into toluene to obtain the total volume of 50 cc. Details of each run and results thereby obtained are shown in Table 1.

of diethylzinc solution in heptane (concentration: 1 mol./ l.) previously prepared was added threto. The polymerization tube was then sealed and heated in an oil bath at 100 C. where a violet reaction takes place immediately, thereby the catalyst solution was coloured with a slight yellow, a precipitate was formed and thus two layers separated. The heat treatment was continued for an hour.

TABLE 1

| Amount of— | | Molar ratio of 2-nitropropane/ diethylzinc [1] | Amount of toluene (cc.) | Polymerization | | Yield of polymer (g.) | Conversion (percent) | Intrinsic viscosity |
|---|---|---|---|---|---|---|---|---|
| Propylene oxide (mol) | 2-nitropropane (cc.) | | | Temperature (° C.) | Time (hr.) | | | |
| 0.1 | 0.05 | 0.05 | 19.0 | 73 | 107 | 0.155 | 2.8 | |
| 0.1 | 0.25 | 0.25 | 18.8 | 73 | 107 | 0.191 | 3.4 | |
| 0.1 | 0.50 | 0.50 | 18.5 | 73 | 107 | 3.400 | 61.3 | 4.6 |
| 0.1 | 1.0 | 1.0 | 18.0 | 73 | 107 | 0.284 | 5.1 | |
| 0.1 | 1.5 | 1.5 | 17.5 | 73 | 107 | 0.197 | 3.5 | |

[1] Diethylzinc was used as toluene solution same as that used in Example 1.

EXAMPLES 3 TO 7

In these examples, the same procedure as described in Example 1 was repeated except that nitromethane and other nitro compounds were used in various amounts and that the polymerization time was varied. Details of each example and results thereby obtained are shown in Table 2.

The tube was opened and under a nitrogen atmosphere, at −78° C., 18.5 cc. of a purified n-heptane and then 5.0 cc. of ethylene oxide were added into the tube and the polymerization was conducted at 70° C. for 17.5 hours. In this case, the polymerization reaction proceeded in a heterogenous system and the formed poly(ethylene oxide) deposited at the bottom of tube in the form of fine par-

TABLE 2

| Example number | Amount of propylene oxide (mol) | Nitro compound | Amount of— | | Molar ratio of nitro compound/ diethylzinc | Amount of toluene (cc.) | Polymerization temperature (° C.) | Polymerization time (hr.) | Yield of polymer (g.) | Conversion (percent) | Intrinsic viscosity |
|---|---|---|---|---|---|---|---|---|---|---|---|
| | | | Nitro compound (cc.) | Diethylzinc [4] (cc.) | | | | | | | |
| 3 | 0.1 | Nitromethane [1] | 0.5 | 1.0 | 0.5 | 18.5 | 73 | 44.5 | 1.9569 | 35.2 | 20.7 |
| 4 | 0.1 | do [1] | 0.25 | 0.5 | 0.5 | 19.3 | 73 | 48.0 | 1.379 | 25.0 | 17.9 |
| 5 | 0.1 | do [1] | 0.125 | 0.25 | 0.5 | 19.6 | 73 | 48.0 | 2.046 | 37.0 | 11.6 |
| 6 | 0.1 | Nitroethane [2] | 0.5 | 1.0 | 0.5 | 18.5 | 73 | 94.0 | 5.0852 | 91.6 | 25.3 |
| 7 | 0.1 | 1-nitropropane [3] | 0.5 | 1.0 | 0.5 | 18.5 | 73 | 36.0 | 0.5308 | 9.6 | 11.2 |

[1] The same solution as used in Example 1 was used.
[2] A solution prepared by dissolving 3.75 g. (0.05 mole) of nitroethane into toluene to obtain the total volume of 50 cc. was used.
[3] A solution prepared by dissolving 4.45 g. (0.05 mole) of 1-nitropropane into toluene to obtain the total volume of 50 cc. was used.
[4] The same solution as used in Example 1 was used.

EXAMPLES 8 TO 11

In each of these examples, nitromethane or nitroethane was used in the catalyst system and ethylene oxide was polymerized. Procedures for the preparation of catalyst and for the polymerization in each example followed those described in Example 1.

Polymer formed in each example was soaked into a large amount of ether and a small amount of methanol was added thereto to destroy the catalyst and, after filtration, the residual polymer was washed three times with 0.5% HCl solution in ether-methanol (80:20). The polymer thus isolated was a white, hard elastomer. Details of each example and results thereby obtained are shown in Table 3.

ticles. After the tube was opened, the formed polymer was soaked into a sufficient amount of isopropyl alcohol to swell the polymer and then washed with ethylether. A white, hard elastomer was obtained with the yield of 4.4 g. (100% conversion). The intrinsic viscosity measured at 30° C. of its acetonitrile solution was 30.

EXAMPLE 13

The same procedure as described in Example 13 was repeated except that n-hexane was used in place of n-heptane. A white, hard elastomer was obtained with the yield of 4.4 g. (100% conversion). The intrinsic viscosity thereof measured as same as in Example 14 was 28.

TABLE 3

| Example number | Amount ethylene oxide (mol) | Nitro compound | Amount of nitro compound (cc.) | Molar ratio of nitro compound/ diethylzinc | Amount of toluene (cc.) | Polymerization | | Yield of polymer (g.) | Conversion (percent) | Intrinsic viscosity [3] |
|---|---|---|---|---|---|---|---|---|---|---|
| | | | | | | Temperature (° C.) | Time (hr.) | | | |
| 8 | 0.1 | Nitromethane [1] | 0.5 | 0.5 | 18.5 | 73 | 20.5 | 3.0364 | 67.6 | 37.5 |
| 9 | 0.1 | do [1] | 0.25 | 0.5 | 19.3 | 73 | 24.3 | 1.507 | 33.7 | 19.2 |
| 10 | 0.1 | do [1] | 0.125 | 0.5 | 19.6 | 73 | 24.3 | 1.572 | 35.0 | 18.3 |
| 11 | 0.1 | Nitroethane [2] | 0.5 | 0.5 | 18.5 | 73 | 20.5 | 3.4244 | 76.3 | 27.1 |

[1] The same solution used in Example 1 was used.
[2] The same solution used in Example 6 was used.
[3] Intrinsic viscosity was measured at 30° C. of acetonitrile solution.

EXAMPLE 12

Into a 40 cc. glass polymerization tube filled with nitrogen was charged 0.0305 g. (0.005 mole) of nitromethane and, after the tube was cooled to −78° C., 1.0 cc.

EXAMPLE 14

In the preparation of catalyst, 0.3 cc. of nitromethane solution and 1.0 cc. of diethylzinc solution both of which were the same as used in Example 1 were used and, prior to the aging treatment of catalyst, 0.07 cc. (0.001 mole) of propylene oxide was added and thereafter the aging was carried out in a closed system at 100° C. for 48 hours. Then the polymerization tube was opened, 10.0 cc. of toluene and 5.0 cc. (0.1 mole) of ethylene oxide were added into the tube and the polymerization was conducted at 73° C. for 15 hours. General procedures for the preparation of catalyst and for the polymerization followed those described in Example 1 and procedure for the after-treatment of the formed polymer followed that described in Example 14. A white, hard elastomer was obtained with the yield of 3.60 g. (80.2% conversion). It will be understood from the result thus obtained that the presence of propylene oxide in the aging of catalyst could result in about three times higher conversion than that obtained without using propylene oxide in the aging of catalyst.

EXAMPLE 15

Into a 40 cc. glass polymerization tube filled with nitrogen was charged 0.25 cc. of a nitromethane solution which was previously prepared by dissolving 3.051 g. (0.05 mole) of nitromethane into toluene to obtain the total volume of 50 cc. The solution was cooled to −78° C. and 0.5 cc. of a diethylzinc solution which was previously prepared by dissolving 5.1 cc. (0.05 mole) of diethylzinc into toluene to obtain the total volume of 50 cc. was added thereto. On the addition of diethylzinc solution, the catalyst solution formed was slightly tinged with yellow. Then, the polymerization tube was heat-sealed at the upper end thereof and subjected to aging treatment at 100° C. for 48 hours. At the end of this period, the catalyst solution was slightly tinged with red. After allowing the solution to stand still until it was cooled to room temperature, the catalyst solution was completely homogenous. The catalyst thus obtained has the molar ratio of nitromethane to diethylzinc of 0.5.

Then, the tube was opened and 9.25 cc. of toluene was added thereto under a nitrogen atmosphere and, after the tube was cooled to −78° C., 6.0 cc. (0.05 mole) of allylglycidylether was added thereto. The tube was then sealed and maintained in a polymerization bath at 70° C. for 64 hours, during which the reaction mixture gradually became viscous and finally solidified. Polyallylglycidylether was obtained as adhesive solid with the yield of 0.47 g. (8.3% conversion), a portion (0.33 g., 5.7% conversion) of which being ether-soluble and methanol-soluble and the remaining portion being ether-insoluble and acetone-insoluble. The reduced viscosity of the ether-soluble portion (adhesive rubbery material) was 3.2 when measured in respect of 0.1% solution in cyclohexane at 50° C.

EXAMPLE 16

The same procedure as described in Example 15 was repeated except that in the preparation of catalyst 0.125 cc. of a nitroethane solution same as that used in Example 6 was used in place of nitromethane and aging treatment of catalyst was carried out at 250° C. for 1 hour and the polymerization time was 190 hours in place of 64 hours. An adhesive elastic solid was obtained with the yield of 2.7 g. (47.3% conversion), a portion (1.8 g., 31.5% conversion) of which being ether-soluble and having a reduced viscosity of 2.6 when measured in respect of 0.1% solution in cyclohexane at 50° C.

EXAMPLE 17

This example demonstrates the polymerization of styrene oxide using the same procedure as described in Example 15 except that the nitromethane solution was used in an amount of 0.15 cc. in place of 0.25 cc. and the polymerization of styrene oxide (5.8 cc., 0.05 mole) was conducted at 70° C. for 48 hours.

At the end of the polymerization period, the polymerization reaction mixture was diluted with a sufficient amount of benzene to obtain a low viscosity solution easy to handle and, after the catalyst was removed therefrom, was freeze-dried. A hard elastic solid was obtained with the yield of 2.36 g. (39.3% conversion), which was acetone-insoluble and had an intrinsic viscosity of 1.9 when measured in respect of α-chloronaphthalene solution at 135° C.

EXAMPLE 18

This example demonstrates the polymerization of phenylglycidylether using the same procedure as described in Example 15 except that the nitromethane solution was used in an amount of 0.20 cc. in place of 0.25 cc. and the polymerization of phenylglycidylether (6.0 cc., 0.05 mole) was conducted at 70° C. for 48 hours.

The polymerization reaction mixture was after-treated as in Example 17 and thus a slightly yellow, hard elastic solid was obtained with the yield of 6.58 g. (98.2% conversion), which was acetone-insoluble and also insoluble in α-chloronaphthalene at 135° C.

EXAMPLES 19 TO 33

These examples demonstrate the copolymerization of various epoxides using the general procedures for the preparation of catalyst and for the polymerization of epoxide as described in Example 15. Details on catalyst compositions, solvents, temperature and time conditions and results obtained are shown in Table 4. In Table 4, the monomeric epoxides, the catalyst components used and the methods of aging adopted are shown by the following symbols:

EO=ethylene oxide
PO=propylene oxide
ECH=epichlorhydrin
AGE=allylglycidylether
Z=diethylzinc
A=triethylaluminium
NM=nitromethane
(O)=aging carried out in an open system
(C)=aging carried out in a closed system After-treatment of the formed polymer in each example was carried out as follows:

In Examples 19 to 22 in which copolymers of propylene oxide with allylglycidylether were produced and in Example 29 in which a copolymer of propylene oxide with epichlorhydrin was produced, the object copolymer was isolated by diluting the polymerization reaction mixture with a sufficient amount of ether to obtain a low viscosity solution easy to handle, allowing the diluted solution to stand for several days, separating the ether-soluble portion from the ether-insoluble portion and removing the ether from the ether-soluble portion.

In Examples 23 to 26 in which copolymers of ethylene oxide with allylglycidylether were produced and in Examples 32 and 33 in which copolymers of ethylene oxide with epichlorhydrin were produced, the object copolymer was isolated by adding to the polymerization reaction mixture a ten-times by volume of n-hexane to precipitate the copolymer.

In examples 30 to 33 in which copolymers of propylene oxide with ethylene oxide were produced, the object copolymer was isolated by adding to the polymerization reaction mixture a sufficient amount of acetone containing 2% of water to obtain a low viscosity solution easy to handle, allowing the diluted solution to stand for several days, centrifuging the resulting solution to isolate the ether-soluble portion and removing the ether from the ether-soluble portion.

TABLE 4

| Example number | Monomer Kind | Monomer Number of moles | Monomer Molar ratio | Catalyst Toluene, cc. | Catalyst Kind | Catalyst Mol percent based on the monomer | Catalyst Molar ratio of NM/Z or NM/A | Aging conditions | Polymerization conditions | Total polymer Yield (g.) | Total polymer Conversion (percent) | Isolated copolymer Yield (g.) | Isolated copolymer Conversion (percent) | Isolated copolymer Reduced viscosity | Appearance |
|---|---|---|---|---|---|---|---|---|---|---|---|---|---|---|---|
| 19 | PO / AGE | 0.05 | 4/1 | 9.4 | Z-NM | 1.0 | 0.5 | 100° C. 0.5 hours (O) | 70° C., 74 hours | 0.65 | 18.7 | 0.49 | 14.1 | ²3.5 | Rubbery elastomer. |
| 20 | PO / AGE | 0.05 | 4/1 | 9.4 | Z-NM | 1.0 | 0.25 | 250° C., 0.5 hours (C) | do | 1.11 | 32.0 | 0.88 | 25.3 | ²6.5 | Adhesive rubbery elastomer. |
| 21 | PO / AGE | 0.05 | 4/1 | 9.4 | Z-NM | 1.0 | 0.25 | do | do | 0.67 | 15.6 | 0.51 | 11.8 | ²2.3 | Do. |
| 22 | PO / AGE | 0.05 | 4/1 | 9.0 | A-NM | 1.0 | 1.0 | 100° C., 1.0 hours (O) | 70° C., 60 hours | 0.24 | 6.9 | 0.22 | 6.3 | ²0.3 | Adhesive solid. |
| 23 | PO / EO | 0.05 | 4/1 | 9.4 | Z-NM | 1.0 | 0.5 | 100° C., 0.5 hours (O) | 70° C., 74 hours | 1.61 | 55.6 | 1.48 | 51.0 | 24.0 | Rubbery elastomer. |
| 24 | AGE / EO | 0.05 | 4/1 | 9.4 | Z-NM | 1.0 | 0.25 | 250° C., 0.5 hours (C) | do | 1.85 | 63.7 | 1.70 | 58.6 | ²7.2 | Very hard, elastic solid. |
| 25 | AGE / EO | 0.05 | 4/1 | 9.4 | Z-NM | 1.0 | 0.25 | do | do | 1.85 | 46.8 | 1.80 | 45.4 | ²4.6 | Hard, elastic solid. |
| 26 | AGE / EO | 0.05 | 4/1 | 9.0 | A-NM | 1.0 | 1.0 | 100° C., 1.0 hours (O) | 70° C., 60 hours | 0.45 | 15.5 | 0.42 | 14.4 | ²3.0 | Do. |
| 27 | EO / ECH | 0.05 | 4/1 | 9.4 | Z-NM | 1.0 | 0.5 | 100° C., 0.5 hours (O) | 70° C., 69.6 hours | 0.42 | 15.9 | 0.31 | 11.5 | ¹8.0 | Adhesive solid. |
| 28 | EO / ECH | 0.05 | 4/1 | 9.0 | A-NM | 1.0 | 1.0 | 100° C., 1.0 hours (O) | 70° C., 60 hours | 0.29 | 8.0 | 0.14 | 3.9 | ¹12.9 | Do. |
| 29 | EO / ECH | 0.05 | 4/1 | 9.0 | A-NM | 1.0 | 1.0 | do | do | 0.13 | 4.2 | 0.12 | 4.1 | ²5.3 | Adhesive semisolid. |
| 30 | PO / EO | 0.05 | 4/1 | 9.4 | Z-NM | 1.0 | 0.5 | do | do | 1.93 | 69.9 | 0.66 | 23.9 | ¹29.4 | Elastic solid. |
| 31 | PO / EO | 0.05 | 4/1 | 9.4 | Z-NM | 1.0 | 0.5 | do | do | 1.69 | 72.1 | 0.89 | 37.9 | ¹39.4 | Do. |
| 32 | PO / EO | 0.05 | 4/1 | 9.3 | Z-NM | 1.0 | 0.25 | 250° C., 0.5 hours (C) | do | 2.55 | 92.2 | 1.30 | 47.0 | ¹17.3 | Brittle solid. |
| 33 | PO / EO | 0.05 | 4/1 | 9.3 | Z-NM | 1.0 | 0.25 | do | do | 1.47 | 62.7 | 1.41 | 60.1 | ¹13.6 | Elastic solid. |

¹ Reduced viscosity measured at 25° C., of 0.1% chloroform solution.
² Reduced viscosity measured at 25° C. of 0.1% benzene solution.

What we claim is:

1. A process for the polymerization of epoxides comprising the steps of conducting said process in the presence of a catalyst comprising a reaction product of a dialkylzinc with a nitro compound selected from the group consisting of mono- and di-nitroparaffins, mono- and di-nitroolefins, halogen-substituted nitroparaffins, alkyl-nitroalkyl ethers, mono- and di-nitrocycloalkanes and phenyl-nitromethane, the molar ratio of the nitro compound to dialkylzinc being 0.05–4.0 to 1.

2. A process as claimed in claim 1 wherein the nitroparaffin is nitromethane.

3. A process as claimed in claim 1 wherein the nitroparaffin is nitroethane.

4. A process as claimed in claim 1 wherein the catalyst is subjected to aging treatment prior to the use in the polymerization.

5. A process as claimed in claim 4 wherein the aging treatment of catalyst is carried out in an open system at a temperature of from room temperatures to 250° C. for 10 minutes to 2 days.

6. A process as claimed in claim 4 wherein the aging treatment of catalyst is carried out in a closed system at a temperature of from room temperatures to 250° C. for 10 minutes to 7 days.

7. A process as claimed in claim 1 wherein the catalyst to be used in the polymerization is prepared in situ in the presence of epoxide to be polymerized.

8. A process as claimed in claim 1 wherein the catalyst to be used in the polymerization is prepared prior to contact with epoxide to be polymerized.

9. A process as claimed in claim 1 wherein the polymerization is carried out in the presence of an inert diluent.

10. A process as claimed in claim 1 wherein the polymerization is carried out at a temperature of from −70° C. to 200° C.

References Cited

UNITED STATES PATENTS

| | | | |
|---|---|---|---|
| 3,532,644 | 10/1970 | Mange et al. | 260–47 EP |
| 3,455,847 | 7/1969 | Furukawa et al. | 260–2 |
| 3,301,796 | 1/1967 | Herold | 260–2 E PA |
| 2,387,517 | 10/1945 | Kraus | 252–429 X |
| 3,135,706 | 6/1964 | Vandenberg | 252–431 X |

OTHER REFERENCES

Sheverdina et al.: Methods of Elemento-organic Chemistry: The Organic Compounds of Zinc and Cadmium (1967).

PATRICK P. GARVIN, Primary Examiner

U.S. Cl. X.R.

252–431 N; 260–2 EP, 47 EP, 88.3 A, 429.9